(12) United States Patent
Maier

(10) Patent No.: US 8,245,496 B2
(45) Date of Patent: *Aug. 21, 2012

(54) CONTROL AND/OR DRIVE DEVICE FOR A FLYING BODY

(75) Inventor: Thomas Maier, Lauffen (DE)

(73) Assignee: Astrium GmbH, Taufkirchen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,335

(22) Filed: Mar. 19, 2010

(65) Prior Publication Data

US 2010/0170223 A1    Jul. 8, 2010

Related U.S. Application Data

(63) Continuation of application No. 11/228,288, filed on Sep. 19, 2005, now Pat. No. 7,707,820.

(30) Foreign Application Priority Data

Sep. 20, 2004    (DE) .......................... 10 2004 045 855

(51) Int. Cl.
*F02K 1/00* (2006.01)
*F02K 9/28* (2006.01)

(52) U.S. Cl. .......................................... 60/229; 60/251

(58) Field of Classification Search .................... 60/251, 60/204, 229, 253, 257, 200.1, 252, 254; 244/3.22, 244/3.21, 169, 171.1, 171.2
See application file for complete search history.

(56) References Cited

U.S. PATENT DOCUMENTS

| | | | |
|---|---|---|---|
| 3,068,641 A | 12/1962 | Fox | |
| 3,295,323 A | 1/1967 | Holzman | |
| 3,646,597 A | 2/1972 | Feemster | |
| 5,016,835 A | 5/1991 | Kranz | |
| 5,711,348 A | 1/1998 | Morash et al. | |
| 6,125,763 A | 10/2000 | Kline et al. | |
| 6,367,244 B1 * | 4/2002 | Smith et al. ..................... | 60/251 |
| 6,393,830 B1 | 5/2002 | Hamke et al. | |
| 6,912,839 B2 | 7/2005 | Kline et al. | |
| 2005/0120703 A1 | 6/2005 | Rohrbaugh et al. | |

FOREIGN PATENT DOCUMENTS

| | | |
|---|---|---|
| EP | 1173668 | 1/2002 |
| GB | 2156290 | 10/1985 |
| JP | 8-177629 | 7/1996 |

* cited by examiner

*Primary Examiner* — Ehud Gartenberg
*Assistant Examiner* — Gerald Sung
(74) *Attorney, Agent, or Firm* — Greenblum & Bernstein, P.L.C.

(57) ABSTRACT

Control and/or drive device for a flying body for ejecting hot gas streams of a combusted fuel combination of at least a first and second component. Device includes a first hollow chamber body structured and arranged to contain first component, a second hollow chamber body structured and arranged to contain second component, a controllable fuel valve arranged between first hollow chamber body and second hollow chamber body to control feed of first component to second hollow chamber body, and a plurality of outlets structured and arranged to eject respective hot gas streams for influencing a flight path of flying body. Second hollow chamber body is formed as a combustion chamber for combusting the at least first and second components within second hollow chamber body to generate respective hot gas streams, and plurality of outlets are connected to the second hollow chamber body.

19 Claims, 1 Drawing Sheet

CONTROL AND/OR DRIVE DEVICE FOR A FLYING BODY

CROSS-REFERENCE TO RELATED APPLICATIONS

The present application is a Continuation of U.S. application Ser. No. 11/228,288 filed Sep. 19, 2005 and claims priority under 35 U.S.C. §119 of German Patent Application No. 10 2004 045 855.3 filed Sep. 20, 2004, the disclosures of which are expressly incorporated by reference herein in their entireties.

BACKGROUND OF THE INVENTION

1. Field of the Invention

The present invention relates to a control and/or drive device for a flying body for the ejection of a hot gas stream by combustion of a fuel (propellant) combination.

2. Discussion of Background Information

Such a control and/or drive device is used for example in a so-called Divert and Attitude Control System, which serves to control a flying body during a final approach to a target. For example, a Divert and Attitude Control System is used in order to control a flying body, for example in the final approach to a target. Control and/or drive devices hitherto used for such flying bodies are basically realized with two different drive variants.

The first variant is a so-called solid-fuel drive, in which the drive unit is charged with a solid, pulverulent or paste-like fuel for influencing the flight path of the flying body. A conventional structure involves arranging the whole fuel supply, generally in the form of rod-shaped or tubular fuel batches arranged in parallel, in a cylindrical combustion chamber, where the fuel supply is ignited and also combusted. With such a drive concept it was hitherto extremely difficult to control the combustion of a solid-fuel drive once it had been ignited, to stop an ignition once it had been initiated, or even to reignite the fuel batch. For this reason the procedure adopted hitherto was to combust the whole fuel supply and/or to charge oppositely operating deflection nozzles with an identical gas stream so that the deflection nozzles cancel one another out and an undesirable change in flight path is thereby prevented. However, such a procedure results in a comparatively large loss of fuel during the mission and leads therefore to a poor utilization of the fuel. On the other hand the use of a solid-fuel drive has specific advantages, in particular its relatively simple structure, uncomplicated handling, constant readiness for use, as well as the comparatively low toxicity.

The second variant for realizing a drive unit described above is a liquid-fuel drive, for example based on a complex hypergolic binary substance drive. Such a liquid-fuel drive obtains its thrust from the combustion of liquid propellants and is in principle more complicated as regards structure than a solid-fuel drive described above. Liquid-fuel drives are however very widely used in space travel on account of their generally longer combustion times, their thrust which can be accurately controlled, the problem-free start-up and shut-down, as well as their higher energy content. A serious disadvantage of a liquid-fuel drive however is the toxicity of the fuels.

EP 1 173 668 B1 describes a rocket drive arrangement with a drive system that comprises a plurality of eccentrically arranged rocket propulsion units, in which each of the propulsion units has its own combustion chamber. Each of these propulsion units can be ignited independently of the others. To achieve combustion in a combustion chamber a combustion reaction is initiated between a liquid oxidizing agent and a fuel component. This component comprises granular solid fuel components stored in the respective combustion chambers of the hybrid rocket propulsion units.

SUMMARY OF THE INVENTION

The present invention provides a compact control and/or drive device for a flying body that enables fuels to be used that are not critical as regards toxicity. Moreover, the present invention realizes a low-loss drive and a low-loss control for a flying body.

According to the invention, a control and/or drive device for a flying body includes a first hollow chamber body, which contains a first component of a fuel combination that is in liquid or gaseous form, and a second hollow chamber body, which contains a second component of the fuel combination that is in solid or paste-like form. The first hollow chamber body and the second hollow chamber body are connected to one another via a controllable fuel valve in order to control a feed of the first component to the second hollow chamber body. A plurality of outlets are provided for the ejection of a respective hot gas stream that is suitable in each case for influencing a flight path of the flying body, and the second hollow chamber body is designed as a combustion chamber for the combustion of the first and second components of the fuel combination when fed into the second hollow chamber body in order to generate the respective hot gas streams. The outlets for the ejection of a respective gas stream are connected to the second hollow chamber body and, thus, to the outlets of the joint combustion chamber.

The control and/or drive device according to the invention for a flying body comprises a first hollow chamber body, in which is arranged a first component of a fuel combination, the first component being liquid or gaseous. A second component of the fuel combination, which is solid or paste-like, is arranged in a second hollow chamber body. The first hollow chamber body and the second hollow chamber body are connected to one another via a controllable fuel valve in order to control a feed of the first component into the second hollow chamber body. A plurality of outlets for the ejection of a respective hot gas stream are provided, which are in each case suitable for influencing a flight path of the flying body. The second hollow chamber body is designed as a combustion chamber for the combustion of the first and second components of the fuel combination when fed together in the second hollow chamber body, in order to generate the respective hot gas streams. The outlets for the ejection of a respective gas stream are connected to the second hollow chamber body acting as a common combustion chamber to the outlets.

A very compact hybrid or alternatively reverse hybrid concept is thus employed in the invention, which combines in a compact manner the advantages of the two types of drive, namely solid-fuel drive and liquid-fuel drive, mentioned above. At the same time a fuel combination that exhibits no toxicity or only a very slight toxicity can be employed by using suitable components. Furthermore advantageous components of the fuel combination are used that permit a reignition of the combustion in the second hollow chamber body after extinction of the combustion, if the fuel valve is reopened. For this purpose it is necessary to provide only one fuel valve and in each case only one hollow chamber for the storage of the respective component of the fuel combination.

The control and/or drive device according to the invention provides an improved mission profile of a flying body, in particular a guided missile, since the combustion in the second hollow chamber body can be stopped as required by a central control unit and can be reignited as required. An ignition or reignition of the combustion in the second hollow chamber body, the so-called combustion chamber, is initiated by for example a laser or the like. The combustion can be interrupted by centrally controlled closure of the fuel valve by interrupting the feed of the liquid or gaseous component. In this connection the regulation of the fuel valve is effected depending on the system and mission requirements.

Preferably the control and/or drive device according to the invention is part of a Divert and Attitude Control System of a flying body, in particular a guided missile, by which an approach of the latter to a predetermined target can be controlled. Applications of the control and/or drive unit in satellites and carrier rockets are also possible however.

According to an advantageous embodiment of the invention a liquid or gaseous oxidizing agent that is essential for combustion, for example in the form of liquid oxygen, fluorine, nitric acid or nitrogen peroxide, is arranged in the first hollow chamber body. A solid or paste-like fuel, for example in the form of polyethylene or lithium aluminum hydride, is arranged in the second hollow chamber body, i.e. the combustion chamber. In this connection pure polyethylene or also polyethylene mixed with a certain percentage of an oxidizing agent can also be arranged as solid or paste-like fuel in the combustion chamber. Although this form of fuel contains a minor proportion of an oxidizing agent in a mixture, this is however not sufficient for a combustion. Combustion is possible only under the addition of a separate oxidizing agent from the first hollow chamber body. Such a fuel combination, in which the fuel is present in liquid or paste-like form and the oxidizing agent is liquid or gaseous, is a so-called hybrid fuel combination.

In a further embodiment of the invention a reverse hybrid fuel combination is used, in which a liquid or gaseous fuel, for example hydrazine or kerosene, is contained in the first hollow chamber body, and a solid or paste-like oxidizing agent is contained in the second hollow chamber body, i.e. the combustion chamber. Ammonium perchlorate or ammonium nitrate for example is used as solid or paste-like oxidizing agent.

In a modification of the invention the second hollow chamber body is connected in an outlet region to an outlet device for the ejection of the gas streams, which guides the gas streams from the second hollow chamber body into in each case at least one expansion nozzle per outlet. For example the outlet device comprises a plurality of hot gas valves that are each switched between the second hollow chamber body and a respective expansion nozzle in order to control the gas streams. For example position control thrust nozzles and transverse thrust nozzles, which can be aligned in various directions, are provided for controlling the flight path of the flying body. The combustion chamber is in this connection connected, for example by pipelines, to the hot gas valves for the position control thrust nozzles as well as to the hot gas valves of the transverse thrust nozzles. Alternatively the hot gas valves can also be connected directly to the combustion chamber.

Preferably the hot gas valves for the smaller position control thrust nozzles are controlled via electromagnetically actuatable valves, and for the ejection of the gas stream are connected to a respective position control thrust nozzle. The control of the hot gas valves for the transverse thrust nozzles is preferably effected by electromagnetically regulated hydraulic valves or pneumatic valves. In an advantageous embodiment a piston or a membrane that is arranged between a storage container for a hydraulic fluid and the interior of the combustion chamber, is provided for generating a hydraulic pressure for the actuation of the hydraulic valve. In this connection the piston and/or the membrane is/are arranged and designed in such a way that a pressure produced by the combustion in the combustion chamber acts on the piston or the membrane, which then releases the resultant force to the hydraulic fluid.

The present invention is directed to a control and/or drive device for a flying body for ejecting a hot gas stream of a combusted fuel combination of at least a first and second component. The device includes a first hollow chamber body structured and arranged to contain the first component, a second hollow chamber body structured and arranged to contain a second component, a controllable fuel valve arranged between the first hollow chamber body and the second hollow chamber body to control a feed of the first component to the second hollow chamber body, and a plurality of outlets structured and arranged to eject respective hot gas streams for influencing a flight path of the flying body. The second hollow chamber body is formed as a combustion chamber for combusting the at least first and second components within the second hollow chamber body to generate the respective hot gas streams, and the plurality of outlets being connected to the second hollow chamber body.

According to a feature of the invention, the first and second components can be formulated for reignition after extinction of combustion in the second hollow chamber body when the controllable fuel valve is opened.

In accordance with another feature of the instant invention, the first and second components may be formulated such that the fuel combination has no or only a very slight toxicity.

In accordance with still another feature, the second hollow chamber body can contain a pure fuel or a mixed fuel that burns only after addition of a separate oxidizing agent.

Moreover, first hollow chamber body may contain a liquid or gaseous oxidizing agent; and the second hollow chamber body contains a solid or paste-like fuel. The second hollow chamber body can contain polyethylene or lithium aluminum hydride as the solid or paste-like fuel.

The first hollow chamber body can contain a liquid or gaseous fuel; and the second hollow chamber body contains a solid or paste-like oxidizing agent. Further, the second hollow chamber body may contain ammonium perchlorate or ammonium nitrate as the solid or paste-like oxidizing agent. The first hollow chamber body may contain hydrazine or kerosene as the liquid or gaseous fuel.

According to a further feature of the present invention, the plurality of outlets may include at least one expansion nozzle, and an outlet region of the second hollow chamber body can be connected to outlet devices to channel the gas streams from the second hollow chamber body to the at least one expansion nozzle.

Further, the outlet device may include a plurality of hot gas valves, which are switchable to control a respective gas stream between the second hollow chamber body and a respective expansion nozzle. Moreover, the invention can include an electromagnetically actuatable valve, and at least one of the at least one expansion nozzles can include comprises a position control thrust nozzle, such that at least one of the plurality of hot gas valves may be is controllable via the electromagnetically actuatable valve and can be connected to the position control thrust nozzle for ejecting the gas stream. Still further, the invention can include an electrically controllable hydraulic valve, and at least one of the at least one expansion nozzles can be a transverse thrust nozzle, such that the at least one of the plurality of hot gas valves can be controlled by the electrically controllable hydraulic valve and can be connected to the transverse thrust nozzle for ejecting the gas stream. Further still, a piston or a membrane can be structured and arranged to generate hydraulic pressure for actuating the hydraulic valve, and the piston or membrane can be arranged between a storage vessel for a hydraulic fluid and an interior of the second hollow chamber body. The piston or membrane may be arranged so that a pressure generated by combustion in the second hollow chamber body acts on the piston or the membrane, which then releases a resultant force to the hydraulic fluid.

According to another feature of the invention, the control and/or drive device can be structured and arranged to control an approach of the flying body to a predetermined target.

Further, the control and/or drive device can be structured and arranged as part of a Divert and Attitude Control System of the flying body.

According to still another feature of the instant invention, the flying body can be a guided missile, satellite or carrier rocket.

The present invention is directed to a process for controlling a flying body. The process includes feeding a first component of a fuel combination into a chamber containing a second component of the fuel combination, combusting the fuel combination in the chamber, and channeling hot gas streams generated by the combusting fuel combination to a plurality of outlets that eject respective hot gas streams for influencing a flight path of the flying body.

According to another feature of the invention, the first component can include a liquid or gaseous oxidizing agent, and the second component can include a solid or paste-like fuel.

In accordance with still yet another feature of the present invention, the first component may include a liquid or gaseous fuel, and the second component may include a solid or paste-like oxidizing agent.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
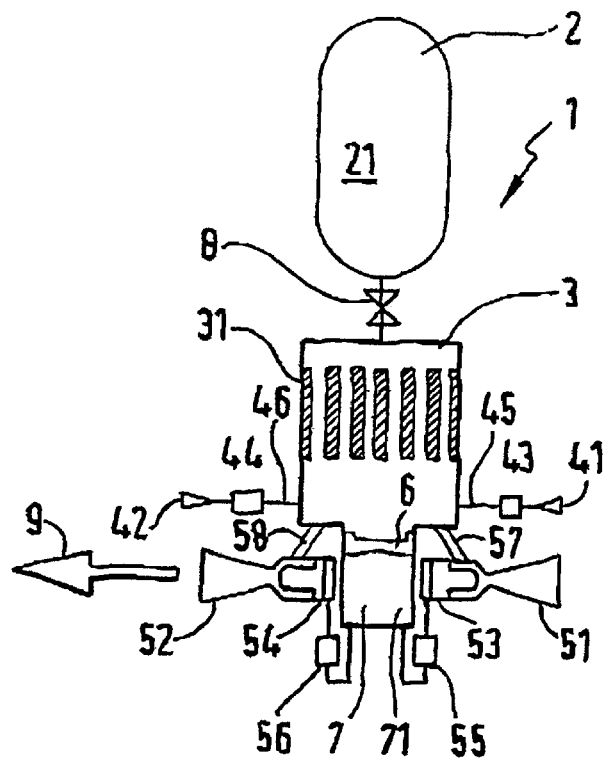
FIG. 1 illustrates a first embodiment of a control and/or drive device for a flying body according to the invention.

FIG. 1 shows a first embodiment of a control and/or drive device according to the invention, in which a hybrid fuel combination is used. A first hollow chamber body 2 as well as a second hollow chamber body 3, which is designed as a combustion chamber, are provided as principal constituents of the control and/or drive device. The hollow chamber bodies 2 and 3 are arranged above one another and are connected to one another via a controllable fuel valve 8. The first hollow chamber body 2 contains a first component 21, which is in liquid or gaseous form, of the fuel combination. In this connection the first component is in particular a liquid or gaseous oxidizing agent, for example in the form of liquid or gaseous oxygen, fluorine, nitric acid or nitrogen peroxide. A second component 31, in solid or paste-like form, of the fuel combination is arranged in the second hollow chamber body 3. The second component is a solid or paste-like fuel, for example in the form of pure polyethylene or polyethylene mixed with a certain percentage of an oxidizing agent. This fuel mixture is combustible only with the addition of a separate oxidizing agent 21 from the hollow chamber body 2. According to this concept of the invention, either a pure fuel is thus provided in the combustion chamber of the hollow chamber body 3, or a mixed fuel is provided that is combusted only under the addition of a separate oxidizing agent.

The combustion of the fuel combination takes place in the hollow chamber body 3 designed as the combustion chamber, in which the solid or paste-like component of the fuel combination is contained. The combustion in the combustion chamber is initiated by an ignition source, for example by a laser or the like. The combustion can be interrupted by closing the fuel valve 8 that controls the feed of the liquid or gaseous component from the hollow chamber body 2. In this connection the fuel valve is controlled in dependence on the system and mission requirements. The reignition of the combustion in the combustion chamber can be initiated in a similar way. For this purpose the fuel valve 8 is reopened in order to permit the flow of the liquid or gaseous oxidizing agent 21 from the hollow chamber body 2.

The combustion chamber is provided with outlets for the ejection of a respective hot gas stream, these outlets being suitable as a whole for influencing a flight path of the flying body. The outlets for the ejection of a respective gas stream are connected to the second hollow chamber body 3 as a common combustion chamber for the outlets. The drive for influencing the flight path is effected according to the principle of dynamic reaction, an accelerating force in the form of a thrust force being exerted in this way. The drive and deflection effect is generated by a plurality of drive jets that are guided through respective expansion nozzles. The thrust acts in this connection in the opposite direction to the exiting material jet of the hot gas stream.

In order to generate the deflection effect the second hollow chamber body 3 is connected in an outlet region to an outlet device, comprising a plurality of components, for the ejection of the gas streams. On the one hand a plurality of hot gas valves 43, 44 and 53, 54 are provided, which serve to control the respective gas stream. The hot gas valves 43, 44 and 53, 54 are in each case switched between the second hollow chamber body 3 and a respective expansion nozzle 41, 42 and 51, 52. The expansion nozzles 41 and 42 are designed as position control thrust nozzles, and the expansion nozzles 51 and 52 are designed as transverse thrust nozzles. The hot gas valves 43 and 44 are preferably controlled via electromagnetically actuatable valves, and are connected to one of the position control thrust nozzles 41 and 42 for the ejection of the respective gas stream. The hot gas valves 53 and 54 are controlled by electrically-controllable hydraulic valves 55 and 56 and are connected to one of the transverse thrust nozzles 51 and 52 for the ejection of the respective gas stream. A gas stream of the transverse thrust nozzle 52 is identified by way of example by the reference numeral 9. According to the illustration shown in FIG. 1 this would cause the flight path of the flying body to be deflected to the right by the control and/or drive device 1. A smaller thrust is produced however by the position control thrust nozzles 41 and 42. These serve in particular to influence a rotational movement of the flying body, while the transverse thrust nozzles 51 and 52 provide for a lateral movement of the flying body.

The hot gas valves 43, 44 and 53, 54 act as shut-off and throttling devices, whose closure element is moved in order to control the throughput of the hot gas stream. Via the control through the hydraulic valves 55 and 56 the respective valve cone within the hot gas valves 53 and 54 is moved by the force of the hydraulic fluid, in order to influence the gas stream in the pipelines 57 and 58.

A piston or a membrane 6 is provided in order to generate the hydraulic pressure for actuating the hydraulic valves 55 and 56. The piston or the membrane 6 is arranged between a storage vessel 7 for the hydraulic fluid 71 and the interior of the hollow chamber body 3. The piston or the membrane 6 is designed and arranged in such a way that a pressure arising from the combustion in the combustion chamber acts on the piston or on the membrane 6 so that the resultant force is transmitted to the hydraulic fluid 71. The pressure of the combustion chamber thus acts on one side of the piston or membrane, the resultant force being transmitted to the hydraulic fluid 71. The hot gas valves 43, 44 and 53, 54 are, according to the embodiment of FIG. 1, connected via respective pipelines 45, 46 and 57, 58 to the combustion chamber. The hot gas valves may alternatively however also be directly connected to the combustion chamber.

Figure 2:
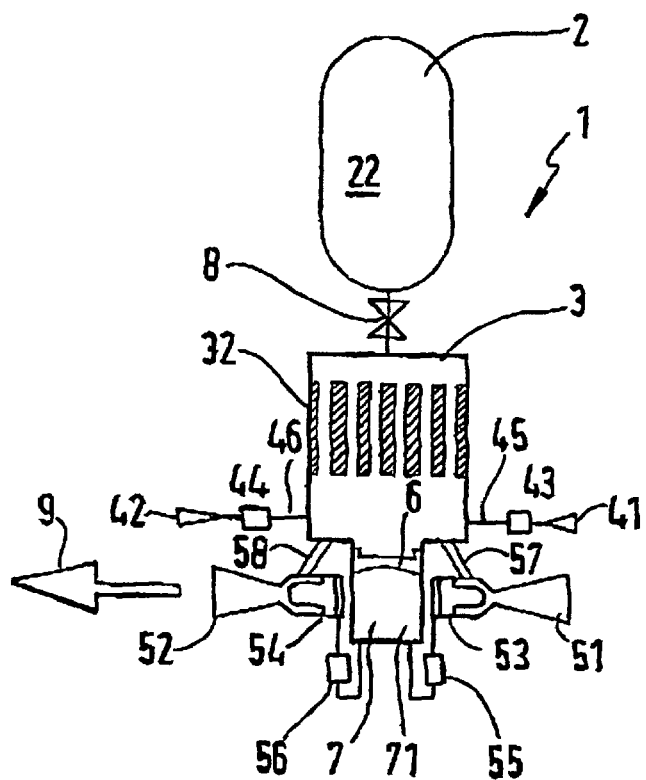
FIG. 2 illustrates a further embodiment of a control and/or drive device for a flying body according to the invention.

FIG. 2 shows a further embodiment of a control and/or drive device according to the invention for a flying body. The control and/or drive device 1 according to FIG. 2 is in this connection constructed as regards the essential components identically to the control and/or drive device 1 according to FIG. 1. In the control and/or drive device according to FIG. 2, in contrast to the embodiment according to FIG. 1 a control and/or drive device is realized with a reverse hybrid fuel combination. The first hollow chamber 2 contains a liquid or gaseous fuel 22, for example in the form of hydrazine or kerosene. The second hollow chamber body 3 contains a solid or paste-like oxidizing agent 32, for example in the form of ammonium perchlorate. Similarly to the case of the combustion chamber according to FIG. 1, a combustion of the liquid or gaseous and of the solid or paste-like components takes place in the hollow chamber body 3 according to FIG. 2 designed as combustion chamber, the components being combined in the combustion chamber via the fuel valve 8. A hot gas stream is generated by the combustion in the combustion chamber, which in the present example of implementation is led outwardly as a gas stream 9 through the transverse thrust nozzle 52 in order to influence the flight path of the flying body. Also, as in FIG. 1, the flying body is for the sake of clarity not illustrated. In order however to influence the flight path of the flying body the control and/or drive device 1 is rigidly connected to the flying body.

Significant advantages of the control and/or drive concept according to the invention for a flying body, as illustrated by way of example in FIGS. 1 and 2, are the possibility of reigniting the combustion within the hollow chamber body 3 as well as the possibility of using fuel combinations of lesser or no toxicity. Accordingly the advantages of pure solid-fuel drives (low toxicity, simple construction) can be combined with the advantages of pure liquid-fuel drives (in particular reignitability) in a compact arrangement, which is of considerable advantage in certain mission profiles. In particular the fuel present can be effectively utilized, since for example in the case where it is not intended to influence the flight path of the flying body, the combustion within the combustion chamber can be stopped by a centralized switching off of the fuel valve and can be reignited as necessary.

Furthermore, a control and/or drive unit can be implemented in a very compact form with the illustrated arrangement. Requirements as regards "green propellants" can be taken into account by a suitable fuel combination. In this connection green propellants are fuels with a lower health hazard potential, which is particularly relevant for example in the case of flying bodies that are deployed from ships. The control and/or drive device according to the invention is preferably part of a Divert and Attitude Control System of a flying body, in particular of a guided missile, by which an approach of the body to a defined target can be controlled. Other applications of the control and/or drive device in satellites and carrier rockets are however also possible. The drive concept according to the invention can thus contribute to a significant improvement of the mission profile.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A control and/or drive device for a flying body for ejecting a hot gas stream of a combusted fuel combination of at least a first and second component, said device comprising:
    a first hollow chamber body structured and arranged to contain the first component;
    a second hollow chamber body structured and arranged to contain a second component;
    a controllable fuel valve arranged between said first hollow chamber body and said second hollow chamber body to control a feed of the first component to said second hollow chamber body;
    a plurality of outlets of said second hollow chamber body being structured and arranged to eject respective hot gas streams for influencing a flight path of the flying body;
    said second hollow chamber body being formed as a combustion chamber for combusting the at least first and second components within said second hollow chamber body to generate said respective hot gas streams; and
    a membrane having a surface in direct communication with the combustion chamber, and being structured and arranged to influence the hot gas streams to at least some of the plurality of outlets according to a pressure within the combustion chamber.

2. The control and/or drive device in accordance with claim 1, wherein the first and second components are formulated for reignition after extinction of combustion in said second hollow chamber body when said controllable fuel valve is opened.

3. The control and/or drive device in accordance with claim 1, wherein the first and second components are formulated such that the fuel combination has no or only a very slight toxicity.

4. The control and/or drive device in accordance with claim 1, wherein said second hollow chamber body contains a pure fuel or a mixed fuel that burns only after addition of a separate oxidizing agent.

5. The control and/or drive device in accordance with claim 1, wherein said first hollow chamber body contains a liquid or gaseous oxidizing agent; and said second hollow chamber body contains a solid or paste-like fuel.

6. The control and/or drive device in accordance with claim 5, wherein said second hollow chamber body contains polyethylene or lithium aluminum hydride as the solid or paste-like fuel.

7. The control and/or drive device in accordance with claim 1, wherein said first hollow chamber body contains a liquid or gaseous fuel; and said second hollow chamber body contains a solid or paste-like oxidizing agent.

8. The control and/or drive device in accordance with claim 7, wherein said second hollow chamber body contains ammonium perchlorate or ammonium nitrate as the solid or paste-like oxidizing agent.

9. The control and/or drive device in accordance with claim 7, wherein said first hollow chamber body contains hydrazine or kerosene as the liquid or gaseous fuel.

10. The control and/or drive device in accordance with claim 1, wherein said plurality of outlets is coupled to a plurality of nozzles, and the outlets of said second hollow chamber body are connected to outlet devices to channel the gas streams from said second hollow chamber body to the plurality of nozzles.

11. The control and/or drive device in accordance with claim 10, wherein said outlet devices include a plurality of hot gas valves, which are switchable to control a respective gas stream between said second hollow chamber body and a respective nozzle.

12. The control and/or drive device in accordance with claim 11, further comprising an electromagnetically actuatable valve, wherein at least one of said plurality of nozzles comprises a position control thrust nozzle, and at least one of said plurality of hot gas valves is controllable via said electromagnetically actuatable valve and is connected to said position control thrust nozzle for ejecting the gas stream.

13. The control and/or drive device in accordance with claim 11, further comprising an electrically controllable hydraulic valve, wherein at least one of said plurality of nozzles comprises a transverse thrust nozzle, and at least one of said plurality of hot gas valves is controlled by said electrically controllable hydraulic valve and is connected to said transverse thrust nozzle for ejecting the gas stream.

14. The control and/or drive device in accordance with claim 1, further comprising a piston that includes the membrane, the piston being structured and arranged to generate hydraulic pressure for actuating a hydraulic valve, and being arranged between a storage vessel for a hydraulic fluid and an interior of said second hollow chamber body;
wherein said membrane is arranged so that a pressure generated by combustion in said second hollow chamber body acts on said membrane, which then releases a resultant force to said hydraulic fluid.

15. The control and/or drive device in accordance with claim 1, structured and arranged to control an approach of the flying body to a predetermined target.

16. The control and/or drive device in accordance with claim 1, structured and arranged as part of a Divert and Attitude Control System of the flying body.

17. The control and/or drive device in accordance with claim 1, wherein the flying body is a guided missile, satellite or carrier rocket.

18. The control and/or drive device in accordance with claim 1, wherein the membrane is structured and arranged to separate the combustion chamber from a hydraulic fluid and to transmit pressure in the combustion chamber to the hydraulic fluid in order to influence the hot gas streams to the at least some of the plurality of outlets.

19. A control and/or drive device for a flying body for ejecting a hot gas stream of a combusted fuel combination of at least a first and second component, said device comprising:
a first hollow chamber body structured and arranged to contain the first component;
a second hollow chamber body structured and arranged to contain a second component;
a controllable fuel valve arranged between said first hollow chamber body and said second hollow chamber body to control a feed of the first component to said second hollow chamber body;
a plurality of outlets of said second hollow chamber body being structured and arranged to eject respective hot gas streams for influencing a flight path of the flying body;
said second hollow chamber body being formed as a combustion chamber for combusting the at least first and second components within said second hollow chamber body to generate said respective hot gas streams;
a plurality of nozzles coupled to the plurality of outlets, at least some of the plurality of nozzles being transverse thrust nozzles; and
a membrane being structured and arranged to separate the combustion chamber from a hydraulic fluid and to transmit pressure in the combustion chamber to the hydraulic fluid in order to influence the hot gas streams to the transverse thrust nozzles.

* * * * *